US006102186A

United States Patent [19]

Pallinger et al.

[11] Patent Number: 6,102,186

[45] Date of Patent: Aug. 15, 2000

[54] ESCALATOR BALUSTRADE/HANDRAIL CONSTRUCTION

[75] Inventors: Reinhard Pallinger; Gerhard Lunardi, both of Vienna, Austria

[73] Assignee: Invento AG, Hergiswil, Switzerland

[21] Appl. No.: 09/438,639

[22] Filed: Nov. 12, 1999

Related U.S. Application Data

[63] Continuation of application No. 09/035,495, Mar. 5, 1998, Pat. No. 5,992,606.

[51] Int. Cl.[7] .......... B65G 15/00

[52] U.S. Cl. .......... 198/337; 198/335

[58] Field of Search .......... 198/335, 337, 198/338

[56] References Cited

U.S. PATENT DOCUMENTS

| | | | |
|---|---|---|---|
| 785,882 | 3/1905 | Hocquart | 198/337 |
| 829,152 | 8/1906 | Hocquart | 198/337 |
| 2,058,379 | 10/1936 | Handy et al. | 198/335 |
| 2,576,556 | 11/1951 | Babson | 198/335 |
| 2,632,550 | 3/1953 | Panter | 198/335 |

FOREIGN PATENT DOCUMENTS

| | | | |
|---|---|---|---|
| 680543 | 12/1962 | Italy | 198/335 |
| 678454 | 5/1949 | United Kingdom | 198/335 |

*Primary Examiner*—James R. Bidwell
*Assistant Examiner*—Joe Dillon, Jr.
*Attorney, Agent, or Firm*—Schweitzer Corman Gross & Bondel LLP

[57] ABSTRACT

An escalator or travelling walkway has a handrail at the top of a balustrade which is centrally supported and deflected by means of a support wheel which rotates about an axle and which has approximately the width of the balustrade. The axle is held by at least one carrier cheek which is connected to either a support construction for the handrail or the balustrade.

7 Claims, 2 Drawing Sheets

ESCALATOR BALUSTRADE/HANDRAIL CONSTRUCTION

This application is a continuation of application Ser. No. 09/035,495 Mar. 5, 1998 issued as U.S. Pat. No. 5,992,606.

The present invention relates to escalators and travelling walkways having a balustrade, a balustrade pedestal, steps or plates for the transport of persons and objects, and a handrail construction, located at and supported by the balustrade, having a handrail for the safety of persons utilizing the escalator or traveling walkway, which handrail is deflectable in a deflection region of the balustrade. The disclosure of priority application EP 97 810166.5 is incorporated herein by reference.

BACKGROUND OF THE INVENTION

An escalator in which a handrail is guided over an upper driving deflecting wheel and a lower free-running deflecting wheel has become known from U.S. Pat. No. 2,632,550. The handrail is supported in its central portion by the deflecting wheel. The handrail side portions not supported by the deflecting wheel, slide on a pair of L-shaped profile members. The deflecting wheel is mounted on an axle supported at the escalator base.

A disadvantage of the known equipment is that, due to the shape of L-section profile members for the handrail, and the shape and size of the deflecting wheel and its support mounting upon the escalator base, relatively large structures are required for incorporation into equipment. The resulting escalator or walkway has a cumbersome appearance and offers few possibilities for an attractive external appearance.

BRIEF DESCRIPTION OF THE INVENTION

The present invention avoids the disadvantages of known equipment and provides an escalator or travelling walkway having a support wheel of approved construction, which deflects the handrail about the end of the balustrade and interacts in a favorable manner with the handrail, and can be incorporated into balustrades of relatively narrow wall width, thus allowing escalators and moving walkways of modern and contemporary appearance to be fabricated. The wheel is mounted to the balustrade by a cheek or reinforcement. The width of the wheel is approximately equal to the width of the balustrade.

The advantages achieved by the invention include an extended service life of the handrails, even in the case of escalators or travelling walkways with balustrade wall thicknesses of only about 10 millimeters. The handrail deflection provided by the present invention is continuously supported, resulting in lower handrail wear. Higher handrail tensions are possible, whereby escalators or travelling walkways of larger spans can be realized. The deflection regions can be formed of widths compatible with those of narrow balustrades, providing for more freedom in the design of the deflection regions. Applicable regulations concerning components projecting inwardly relative to the balustrade can be adhered to in an economical manner.

BRIEF DESCRIPTION OF THE DRAWINGS

The present invention is explained in more detail in the following description of preferred, but nonetheless illustrative embodiments, in association with the annexed drawings, wherein.

BRIEF DESCRIPTION OF THE INVENTION

Figure 1:
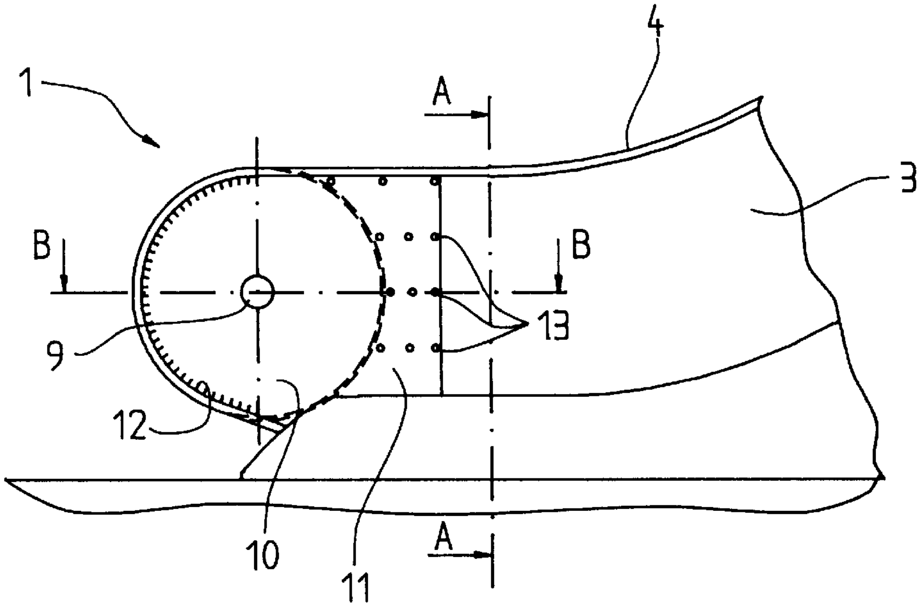
FIG. 1 shows a side view of a deflection region of an escalator.
Figure 2:
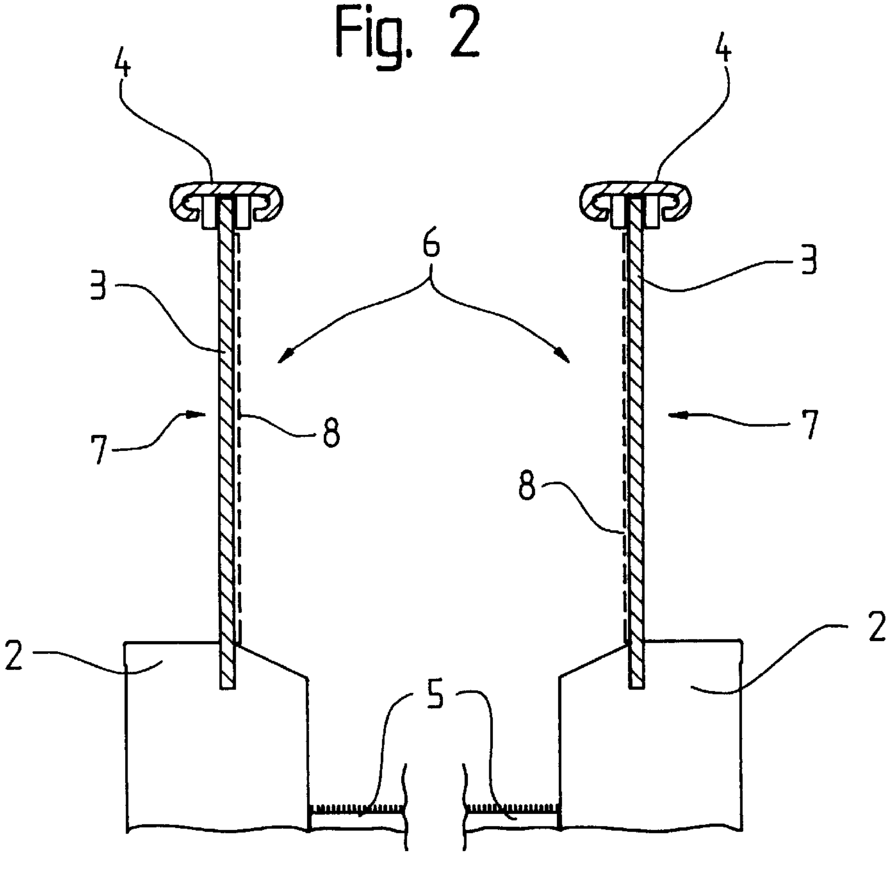
FIG. 2 shows a section in elevation taken along line A—A in FIG. 1.

FIGS. 1 to 5 depict an end deflection region 1 of an escalator or a travelling walkway which essentially comprises a pair of balustrade pedestals 2, a pair of opposed balustrades 3 extending upwardly from the pedestals and continuous handrails 4. The handrails 4 are of an endless loop construction. The portion of the handrail loop riding on the top of the balustrade is available for use. As a given handrail element reaches the end of the balustrade, it is deflected around the balustrade end to return and recirculate to the other end of the escalator/moving walkway, typically within the balustrade pedestal 2. Steps 5 are provided for the transport of persons and objects for an escalator, while plates 5 are provided for a travelling walkway. The steps or plates extend between the balustrade pedestals 2. The inner step or plate sides of the balustrades 3 are designated as transport sides 6, while the outer sides of the balustrades 3 are designated by 7. As subsequently used herein, the term "escalator" shall include both escalators and traveling walkways and thus the term "steps" shall include traveling walkway plates.

In the case of present-day escalators, the balustrades 3 often consist of, for example, glass with a wall thickness of about 10 millimeters, which gives the escalator a slender, light and elegant appearance. According to applicable regulations, parts, such as for example support cheeks or axles in the deflection region, must have only a minimal projection from the balustrades 3, typically being limited to no more than 3 millimeters.

Figure 4:
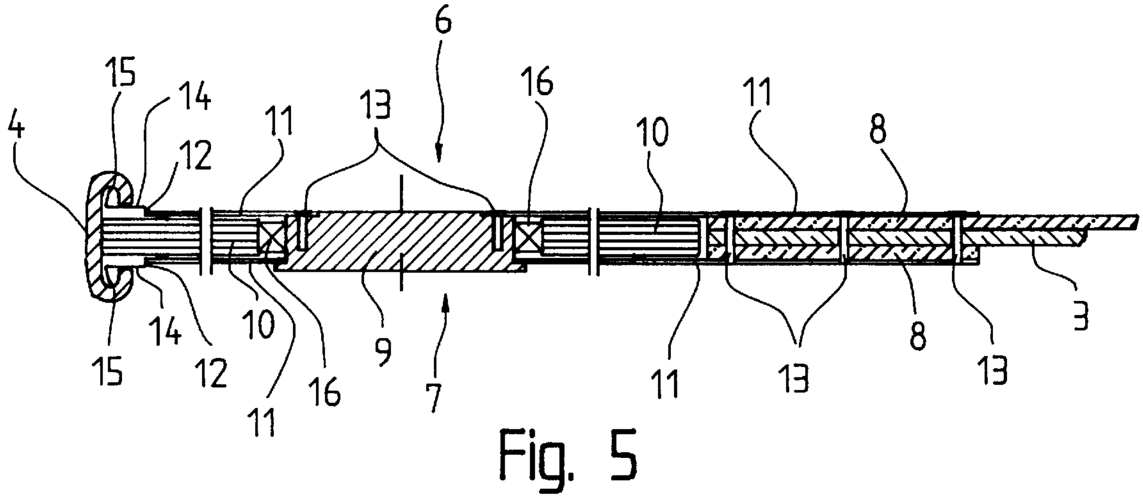
FIG. 4 shows a similar section view taken along line B—B in FIG. 1, with a reinforcement.
Figure 5:
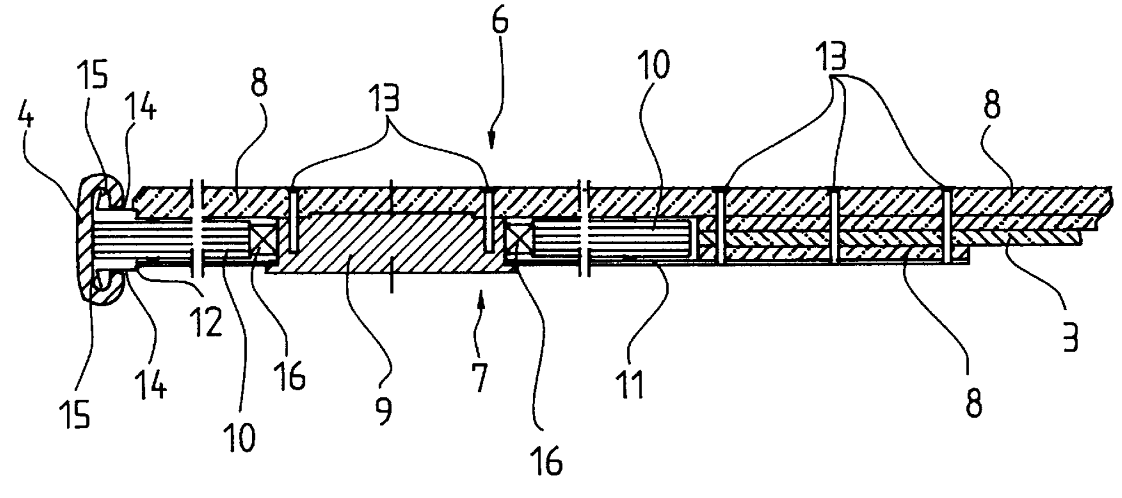
FIG. 5 shows a similar section view taken along line B—B in FIG. 1, with a supporting reinforcement.

The present invention incorporates a support wheel 10 located at a deflection end of the balustrade. The support wheel is of narrow width, which allows a narrow balustrade profile to be maintained. In countries with special standards concerning the spacing between the balustrades 3, a reinforcement 8, normally of the same material as the balustrades 3, can be arranged on the transport sides 6 as shown in FIG. 4. The reinforcement 8 can, as shown in FIG. 5, also serve in the deflection region 1 as a support and/or safety element, which can compensate for obstructions caused by parts projecting from the balustrade 3 and can thereby also minimize risk of accident. As shown in FIGS. 4 and 5, by inclusion of the reinforcement 8 a wider support wheel 10 can also be provided, which supports the handrail 4 over a large area centrally of the rotatable support wheel 10 and deflects the handrail.

FIG. 1 shows the deflection of the handrail 4 by means of support wheel 10, which is rotatable about an axle 9. The support wheel 10 has a wall thickness which approximately corresponds to the wall thickness of the balustrade 3. The axle 9 is supported by at least one support cheek 11 and/or reinforcement 8 (FIG. 2), which are connected to the support construction for the handrail 4 by means of, for example, a weld connection 12 and/or to the balustrades 3 by means of, for example, a screw or rivet connection 13.

Figure 3:
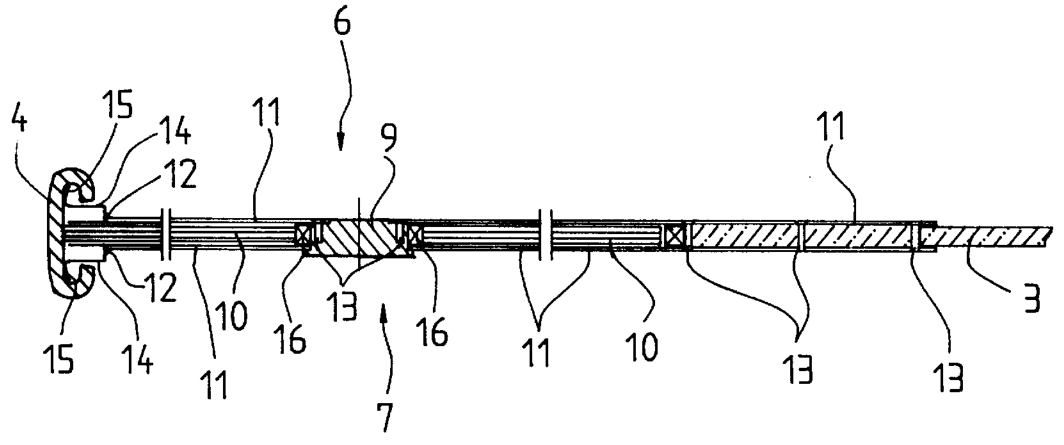
FIG. 3 shows a section view in plan taken along line B—B in FIG. 1.

FIG. 3 shows details of the deflection system of the handrail 4. The axle 9 is connected on the outer side 7 of the balustrade with the support cheek 11 for example by means of a screw or rivet connection 13. In a like manner, the support cheek 11 on the transport side 6 is connected by means of the weld connection 12 to the handrail support construction 14. The handrail support construction 14 comprises a pair of elements arranged on each side of the support wheel 10, and has at one end thereof a slide surface 15 upon which the handrail 4 slides and is guided. The handrail 4 is centrally supported and deflected by the rotatable support wheel 10. The support wheel 10 is rotatably mounted on the axle 9 by means of a bearing 16.

As shown in FIG. 5, the axle 9 projecting outwardly from the balustrade 3 at its outer side 7 may be compensated for with respect to the balustrade thickness by means of the reinforcement 8, so that the balustrade 3 on the transport side 6 can be planar in the deflection region 1. No support cheek is used on the transport side, the reinforcement 8 assuming the equivalent supporting function provided by the support cheek 11 on the outer balustrade side 7.

We claim:

1. An escalator, having a plurality of traveling steps extending along a length of the escalator for the transport of persons and objects located adjacent the steps, comprising a balustrade, at least one balustrade pedestal supporting the balustrade, and a hand rail construction supported upon the balustrade, the balustrade comprising a balustrade wall having opposed transport sides and outer sides and at least one planar reinforcement mounted to at least one of the transport and outer sides and substantially in face to face engagement over the entire height, the handrail construction being deflectable in a deflection region of the balustrade, the deflection region comprising a support wheel carried by the balustrade and handrail construction for deflection of the handrail.

2. The escalator of claim 1, wherein one of the reinforcements is located on the transport side of the balustrade displaced from the deflection region of the balustrade.

3. The escalator according to claim 1, wherein the support wheel is rotatably supported upon an axle held by a bearing in a support cheek connected to the balustrade and the handrail construction.

4. The escalator according to claim 3, wherein the support wheel has a width chosen to provide a wide surface for support and deflection of the handrail.

5. The escalator according to claim 3, wherein the support cheek is located on the outer side of the balustrade and one of the reinforcements is located on the transport side of the balustrade.

6. The escalator according to claim 5, wherein the transport side reinforcement is further connected to the handrail construction and comprises a planar exterior wall.

7. The escalator according to claim 5, wherein the transport side reinforcement is a support check for the bearing.

* * * * *